(12) United States Patent
Moos

(10) Patent No.: US 7,675,817 B2
(45) Date of Patent: Mar. 9, 2010

(54) HYDROCARBON SATURATION DETERMINATION USING ACOUSTIC VELOCITIES OBTAINED THROUGH CASING

(76) Inventor: Daniel Moos, GeoMechanics International, Inc., 5373 W. Alabama, Suite 300, Houston, TX (US) 77056

( * ) Notice: Subject to any disclaimer, the term of this patent is extended or adjusted under 35 U.S.C. 154(b) by 568 days.

(21) Appl. No.: 11/589,445

(22) Filed: Oct. 30, 2006

(65) Prior Publication Data

US 2007/0097787 A1 May 3, 2007

Related U.S. Application Data

(60) Provisional application No. 60/836,339, filed on Aug. 8, 2006, provisional application No. 60/731,438, filed on Oct. 28, 2005.

(51) Int. Cl.
*G01V 1/00* (2006.01)
(52) U.S. Cl. .......................... 367/73; 702/14
(58) Field of Classification Search .................. 367/73; 702/14, 16
See application file for complete search history.

(56) References Cited

U.S. PATENT DOCUMENTS

| | | | |
|---|---|---|---|
| 3,780,301 A | 12/1973 | Smith, Jr. et al. | 250/83.3 R |
| 4,210,967 A | 7/1980 | Ingram | 367/34 |
| 4,594,691 A | 6/1986 | Kimball et al. | 367/32 |
| 4,703,460 A | 10/1987 | Kurkjian et al. | 367/31 |
| 4,843,598 A * | 6/1989 | Medlin | 367/27 |
| 4,972,384 A | 11/1990 | Williams | 367/75 |
| 5,633,590 A | 5/1997 | Vail, III | 324/368 |
| 6,269,311 B1 * | 7/2001 | Berryman | 702/18 |
| 6,807,487 B2 * | 10/2004 | Khan | 702/16 |
| 6,954,402 B2 * | 10/2005 | Brygynevych | 367/25 |
| 6,957,146 B1 | 10/2005 | Taner et al. | 702/14 |
| 6,977,866 B2 * | 12/2005 | Huffman et al. | 367/73 |
| 7,064,551 B2 | 6/2006 | Dubourg et al. | 324/368 |
| 2002/0128777 A1 | 9/2002 | Fanini et al. | 702/11 |
| 2004/0141414 A1 * | 7/2004 | Huffman et al. | 367/51 |
| 2008/0086287 A1 * | 4/2008 | Xu et al. | 703/2 |

FOREIGN PATENT DOCUMENTS

| | | |
|---|---|---|
| EP | 0031989 A1 | 7/1981 |
| GB | 2124377 A | 2/1984 |

OTHER PUBLICATIONS

M. A. Gutierrez et al.; *Theoretical rock physics for bypassed oil detection behind the casing: La Cira-Infantas oil field*, The Leading Edge, Feb. 2001, pp. 192-197, 8 Figs.

J. Dvorkin et al.; *Identifying patchy saturation from well logs*, Geophysics, vol. 64, No. 6 (Nov.-Dec. 1999), pp. 1756-1759, 6 Figs.

(Continued)

*Primary Examiner*—Mark Hellner
(74) *Attorney, Agent, or Firm*—Cantor Colburn LLP

(57) ABSTRACT

Compressional and shear velocities of earth formations are measured through casing. The determined compressional and shear velocities are used in a two component mixing model to provides improved quantitative values for the solid, the dry frame, and the pore compressibility. These are used in determination of hydrocarbon saturation.

15 Claims, 12 Drawing Sheets

OTHER PUBLICATIONS

J. P. Dvorkin et al.; *Elasticity of high-porosity sandstones: Theory for two North Sea datasets*, RP1.6, pp. 890-893, 6 Figs.

V. Saxena; *Hydrocarbon Evaluation Through Modulus Decomposition of Sonic Velocities in Shaly Sands*, SPWLA 37th Annual Logging Symposium, Jun. 16-19, 1996, pp. 1-14, 6 Figs.

R. J. S. Brown et al.; *On the Dependence of the Elastic Properties of a Porous Rock on the Compressibility of the Pore Fluid*, Geophysics, vol. 40, No. 4 (Aug. 1975), pp. 608-616.

James G. Berryman et al.; *Exact results for generalized Gassmann's equations in composite porous media with two constituents*, pp. 1950-1960, 2 Figs.

R. Cardona; *Two theories for fluid substitution in porous rocks with aligned cracks*, pp. 1-4, 3 Figs.

R. Hertzog et al.; *Geochemical Logging with Spectrometry Tools*, SPE Formation Evaluation, Jun. 1989, pp. 153-162, 6 Figs.

S. Iskander; *Logging aids aging fields*, Hart's E&P, Sep. 2003, pp. 37-38.

A. Fondyga, et al.; *Cased Hole Density, Neutron, Sonic and Resistivity Logging in South America, Case Histories, Lessons Learned, and a Methodology for Including the Technology in Formation Evaluation Programs*, SPWLA 45th Annual Logging Symposium, Jun. 6-9, 2004, pp. 1-12, 6 Figs.

D. Moos et al., *Hydrocarbon Saturation Determination Using Acoustic Velocities Recorded Through Casing*, Addendum: Acoustic Determination of Pore Fluid Properties Using a 2-Component Model, pp. 1-13, 8 Figs.

D. Moos et al.; *Paper B2, Acoustic Determination of Pore Fluid Properties Using a Two Component Model*, 1998 SRB Annual Meeting, pp. 1-21.

\* cited by examiner

Input Files

Input file: lithin.txt   key: test
Density input file: rhoin.txt
Parameter file: Param.txt
Ksat output file: Ksat.txt
Kf output file: Kfluid.txt
V output file: Vout.txt

Modulus Constants

|  | clay | sand |
|---|---|---|
| Critical bulk modulus: | 5 | 6 |
| Critical shear modulus: | 0.9 | 1.6 |
| Mineral bulk modulus: | 40 | 36 |
| Mineral shear modulus: | 20.0 | 44 |
| Critical porosity | 0.60 | 0.38 |

Model: HSLB ▽

Mixture type

| Porous componet | Enclosing component |
|---|---|
| ○ Clay | ○ Clay |
| ○ Sand | ○ Sand |
| ● Both | ● Both |

Equal distri... ▽    Mix by volu... ▽

Selected Plots

○ Kphi, ect. plot?
● Sensitivy plot?
○ Endmember plot?
○ Composite dry frame plot
○ Velocity plot?
○ Ksat and G plot?

Run calculations

*FIG. 5*

HYDROCARBON SATURATION DETERMINATION USING ACOUSTIC VELOCITIES OBTAINED THROUGH CASING

CROSS-REFERENCES TO RELATED APPLICATIONS

This application claims priority from U.S. Provisional Patent Application Ser. No. 60/836,339 filed on 8 Aug. 2006 and from U.S. Provisional Patent Application Ser. No. 60/731,438 filed on 28 Oct. 2005.

STATEMENT OF GOVERNMENT SUPPORTED RESEARCH

This application is based in part on research supported by the Department of Energy under grant DE-FG03-97ER82385. The Government has retained no rights in the invention.

BACKGROUND OF THE INVENTION

This invention relates generally to oil and gas well logging tools. More particularly, this invention relates tools for measuring hydrocarbon saturation of earth formations through the use of acoustic velocities measured through casing In petroleum and hydrocarbon production, there is considerable commercial value in the recovery of gas from reservoirs. Over the course of production of gas, there is an increasing influx of water into the reservoir. This may be due to natural causes or it may be, in the case of secondary recovery operations, the result of injection of water into the reservoir. The production of gas thus leads to a decrease in gas saturation of the reservoir. In addition, due to the fact that reservoirs by their very nature comprise permeable earth formations within impermeable strata, production of gas leads to a decrease of gas pressure. The decrease of gas pressure in turn affects the flow pattern of reservoir fluids. Decreases in gas pressure also allow gas that was in solution within liquid phases (e.g., water or oil) to come out of solution. This changes the properties of those liquids. Knowledge of the gas pressure is also very helpful in reservoir development. Knowledge of gas saturation is also important in enhanced oil recovery programs (EOR) where a gas is injected into an injection well and used to direct the flow of oil from the reservoir into a production well. Similar phenomena exist with oil and gas condensate.

A basic methodology underlying the determination of gas saturation and/or gas pressure is that of density determination. One approach involves detection of gamma radiation produced in the formation in response to a high-energy neutron source, referred to as induced gamma ray logging. When the neutron source is pulsed, gamma rays are produced by one of two reactions. The first is inelastic scattering of fast neutrons (neutrons with energies above about one MeV or within about one order of magnitude). The second mechanism is from capture of epithermal neutrons (neutrons with energy of about one eV). The third is from capture of thermal neutrons (neutrons with energy of about 0.025 eV). The fast-neutron lifetimes are very small (a few microseconds) such that during the source pulse a mixed-energy neutron field exists. Shortly after the burst, all neutrons slow down to a thermal energy level and these thermal neutrons wander about until being captured, with a lifetime in the hundreds of microseconds. Gamma rays from inelastic scattering are produced in close proximity to the accelerator, and gamma rays from thermal capture are dispersed farther from the accelerator (up to tens of centimeters). The number of capture gamma rays is strongly influenced by the amount of hydrogen and the thermal neutron capture cross section of the formation. The number of gamma rays produced from inelastic scattering is less dependent on these quantities, and a measurement of such gamma rays is more directly related to the formation density. Use of a pulsed neutron source allows capture gamma rays to be separated from inelastic gamma rays, giving a better estimate of density.

U.S. Pat. No. 3,780,301 to Smith Jr. et al. discloses a method and apparatus for determination of gas saturation using a logging tool deployed in an open borehole. A pulsed neutron source produces pulses of neutrons with energy of about 14 MeV. A single gamma ray detector measures counts of inelastic gamma rays resulting from interaction of the neutrons with nuclei in the formation. Specifically, counts are made in energy bands corresponding to C, O, Si and Ca. By comparing the Si/Ca and C/O ratios in these regions to the Si/Ca and C/O ratios for a known water sand, the relative abundance of limestone in the low hydrogen content formations may be estimated thus distinguishing gas zones from water saturated low porosity limestone.

An alternative method which could be used, but has not hitherto been used in cased boreholes for the determination of hydrocarbon saturation is to measure acoustic velocities (compressional- and shear-wave). Acoustic measurements are deterministic by nature and are not subject to the inherent statistical fluctuations associated with nuclear measurements. The present invention uses acoustic measurements through casing for the determination of hydrocarbon saturation of earth formations.

SUMMARY OF THE INVENTION

One embodiment of the invention is a method of determining hydrocarbon saturation of an earth formation having two components in the matrix. Measurements of compressional and shear velocities of the earth formation are obtained in a cased borehole. Measurements are also made of a porosity of the earth formation and of a fraction of one of the at least two components. A two component mixing model uses the measured compressional and shear velocities, the measured porosity and the measured fraction of the one component to estimate a property of a fluid in the formation. The two components may include a shale whose fraction may be obtained by making a measurement of natural gamma radiation in the borehole. The estimated property may include a fluid compliance and/or a fluid saturation. The model may be defined by obtaining compressional and shear velocities for the formation for a training set and selecting a model parameter that improves a match between a predicted velocity and the compressional velocity and/or the shear velocity for the training set. The estimated parameter may be a hydrocarbon saturation and the method may further include perforating an interval of the borehole based on the estimate of the hydrocarbon saturation. The estimated parameter may include a gas saturation and the method may further include altering a fluid pressure at another borehole.

Another embodiment of the invention is a system used for evaluating an earth formation having at least two components in a matrix of the formation. The system includes a logging tool conveyed in a borehole in the earth formation, the logging tool being configured to make a measurement of a compressional velocity of the formation, a shear velocity of the formation, a porosity of the formation and a fraction of at least one of the two components of the matrix. The system further includes a processor configured to use a two-component mixing model, the measured compressional and shear velocities, the measured porosity and the measured fraction of the at least one component to estimate a property of a fluid in the formation. One of the two components may include a shale and the logging tool may be configured to make a measurement of natural gamma radiation in the borehole. The processor may be further configured to estimate a compliance of a fluid and/or a saturation of a fluid in the earth formation. The processor may further be configured to define the model by obtaining measurements of a compressional velocity and a shear velocity for a training set and selecting a model parameter which improves a match between a predicted velocity from the model and at least one of a measured compressional velocity and a measured shear velocity.

Another embodiment of the invention is a computer readable medium that enables a processor to determine from compressional and shear velocity measurements made in a case borehole in an earth formation a hydrocarbon saturation of the formation. The instructions implement a two-component mixing model for determination of the solid, frame and pore space of the earth formation.

BRIEF DESCRIPTION OF THE FIGURES

The present invention is best understood with reference to the accompanying figures in which like numerals refer to like elements and in which:

FIG. 5 shows the front panel of the forward model used in the present invention;

DETAILED DESCRIPTION OF THE INVENTION

Figure 1:
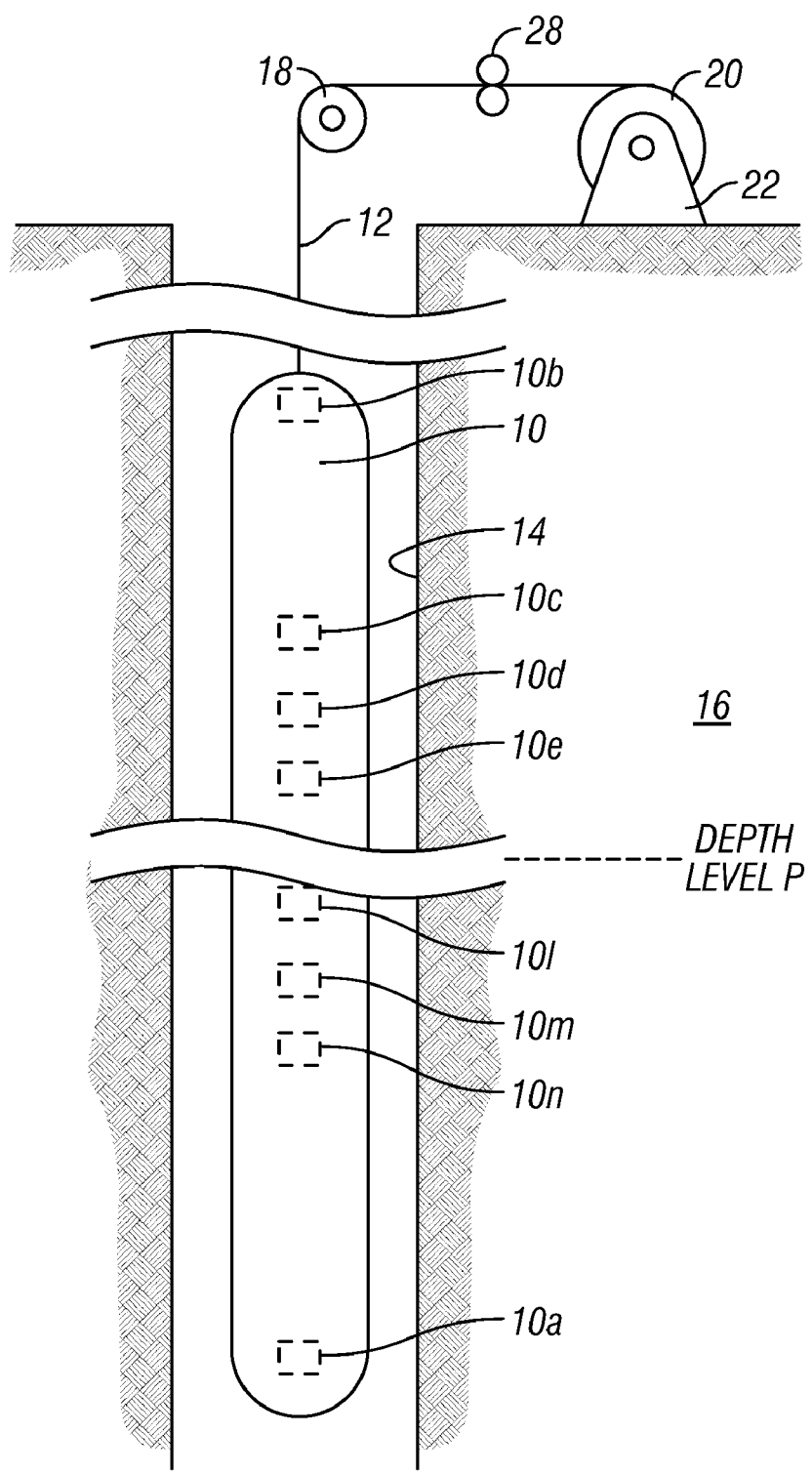
FIG. 1 (prior art) is an overall schematic illustration of a well logging system for determination of compressional velocities.

The measurements needed for the method of the present invention are readily available using prior art methods and apparatus. Two of the measurements needed are the compressional (P-) wave velocity of the formation and the shear (S-) wave velocity of the formation. The P-wave velocity may be obtained, for example, using the device taught in Kimball et al. (U.S. Pat. No. 4,594,691) and illustrated in FIG. 1.

A sonic tool 10 is lowered on an armored multi-conductor cable 12 into a borehole 14 to take sonic logs of a subsurface formation 16. Tool 10 is adapted for movement up and down borehole 14, and includes at least one sonic transmitter 10a (and can include a second sonic transmitter 10b), and a number of sonic receivers, for example twelve receivers 10c through 10n. The receivers are spaced along the length of tool 10 from each other and from the transmitter(s), and preferably the distance between each transmitter and the receiver closest thereto is much greater than the inter-receiver distance. For example, the distance between the transmitter and the receiver nearest thereto is in the range of 5-25 feet (e.g., 13 feet) and the inter-receiver distance is less than half a wavelength of the sonic signal from the transmitter—for example about a foot or, preferably, about half a foot. As tool 10 is drawn up slowly; and preferably steadily, up borehole 10, transmitter 10a periodically generates a sonic signal a part of which passes through paths other than in tool 10 (including paths through formation 16) and is received by each of receivers 10c through 10n. Cable 12 goes to a sheave wheel 18 at the surface and then to a suitable drum and winch mechanism 20 which raises and lowers tool 10 in borehole 14 as desired. Electrical connection between transmitter 10a (and 10b) and receivers 10c through 10n on the one hand and surface equipment on the other hand, is made through suitable multi-element slip-ring and brush contact assembly 22 associated with the drum and winch mechanism 20. A unit 24 contains tool control and pre-processing circuits designated SU which send electrical signals to tool 10 and receive other electrical signals (sonic logs) therefrom via cable 12 and assembly 22, and cooperate with a depth recorder 26, which in turn derives depth level signals from depth measuring wheel 28, so as to associate the signals from receivers 10c through 10n with respective depth levels z in borehole 14. The outputs of sonic receivers 10c through 10n, after optional pre-processing in unit 24, are sent to signal storage 30, which can also receive signals from or through depth recorder 26 so as to associate sonic receiver outputs with respective depth levels z in borehole 14. Storage 30 can store the outputs of sonic receivers 10c through 10n in analog form but more typically stores them in the form of digital sonic log measurements, a set for each respective depth level z, derived by digitizing such analog signals, for example in unit 24. Storage 30 can comprise a magnetic storage device, such as disc or tape, and/or other storage media such as semiconductor or equivalent memory circuits.

Using prior art methods, the compressional velocity of the earth formation is determined. An example of such a determination is disclosed in U.S. Pat. No. 4,210,967 to Ingram, the contents of which are incorporated herein by reference. In the method taught by Ingram, a predetermined signal is removed from waveforms generated in an acoustic investigation of a borehole to enable the accurate detection of relatively weak formation signals. A plurality of waveforms are produced from the different sonic receivers from inside casing set in a borehole. The waveforms include a casing signal which is representative of the acoustic casing wave which traveled from a transmitter through the casing to the receivers. The casing signal is removed by aligning the waveforms in accordance with the known travel times for the casing wave from the transmitter to the receivers and summing the waveforms to produce a casing signal emphasized waveform. A portion of the latter is then subtracted from the waveforms from which the casing signal is thus effectively filtered to facilitate detection and analysis of formation signals present in the waveforms and the compressional velocity $V_p$ of the formation is determined.

Figure 2:
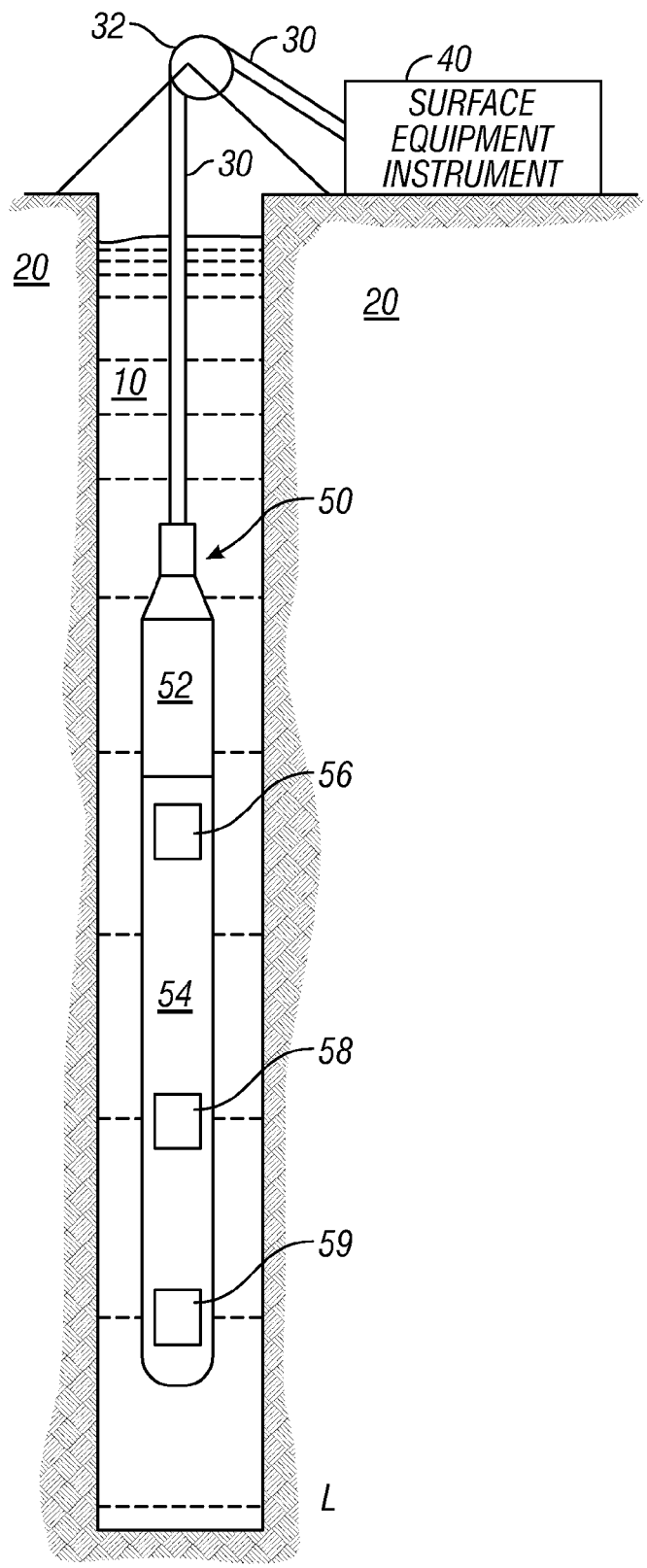
FIG. 2 (prior art) is a view of a dipole acoustic logging system suitable for use with the method of the present invention.

A prior art borehole logging system for determination of formation shear velocity $V_s$ is illustrated generally in FIG. 2. A fluid filled borehole is shown traversing earth formation. A dipole acoustic logging tool 50, a mandrel device adapted for movement in the borehole, is connected to surface equipment and instrumentation 40 by an armored multi-conductor cable 30. The cable 30 is used to raise and lower the tool 50 through borehole, and to this end passes over a sheave wheel 32 to a suitable drum and winch mechanism (not shown), an element of the surface equipment 40. Surface equipment 40 also includes a suitable measuring wheel mechanism (not shown), which rotates as a function of the movement of the cable 30 to measure the depth of the tool 50 in the borehole.

The tool 50 includes dipole transmitter 56, spaced apart from dipole receivers 58 and 59 in transducer cartridge 54. Two receivers are shown, although only a single receiver or more than two receivers may be used. Transducers 56, 58 and 59 preferably are of the indirect excitation type, such as disclosed in European patent application Publication No. 31,989, which is incorporated herein by reference, or in UK patent application Publication No. 2,124,377, to Winbow et al., the contents of which are incorporated herein by reference. Downhole circuits for controlling the excitation of the transmitter 56, the reception of signals through receivers 58 and 59, communications, other functions of tool 50, and possibly some signal processing, are contained in electronics cartridge 52. The cartridge 52 is coupled to surface instrumentation 40 via the conductors in cable 30. Surface instrumentation 40 includes other circuits for communications, power distribution, and signal processing. The signal processing functions may be performed by dedicated circuits or one or more general purpose processors or microprocessors, as desired.

These methods used here were developed and have been used in open well bores for many years. However, in the present invention, the methods are applied to logging data in a cased hole. This situation arises when the well is too unstable to permit open-hole logs to be run without excessive risk of hole collapse, when open-hole logs are too costly due to operational constraints, or when the well was cased before these logs were run. The latter situation arises in old wells and in wells with deep targets that were drilled through shallow possibly hydrocarbon-bearing units (bypassed pay). The same problems occur when measuring saturation as a function of time in a variety of situations, including during production (to monitor changes in saturation and migration of fluid interfaces), within injector wells (to determine where the injected fluids are going), and when it is important to measure fluid content or other properties across a field to monitor the progress of active processes such as steam or waterfloods.

The approach revealed in this application is to quantify hydrocarbons and porosity using acoustic logs recorded within cased wells or through tubing is unique in that it employs a more sophisticated, two-component model which can provide more accurate estimations of hydrocarbon saturation than can one-component models such as Gassman. It is the use of this theoretical approach for computing hydrocarbon saturation and porosity that forms the basis for this application.

Figure 3:
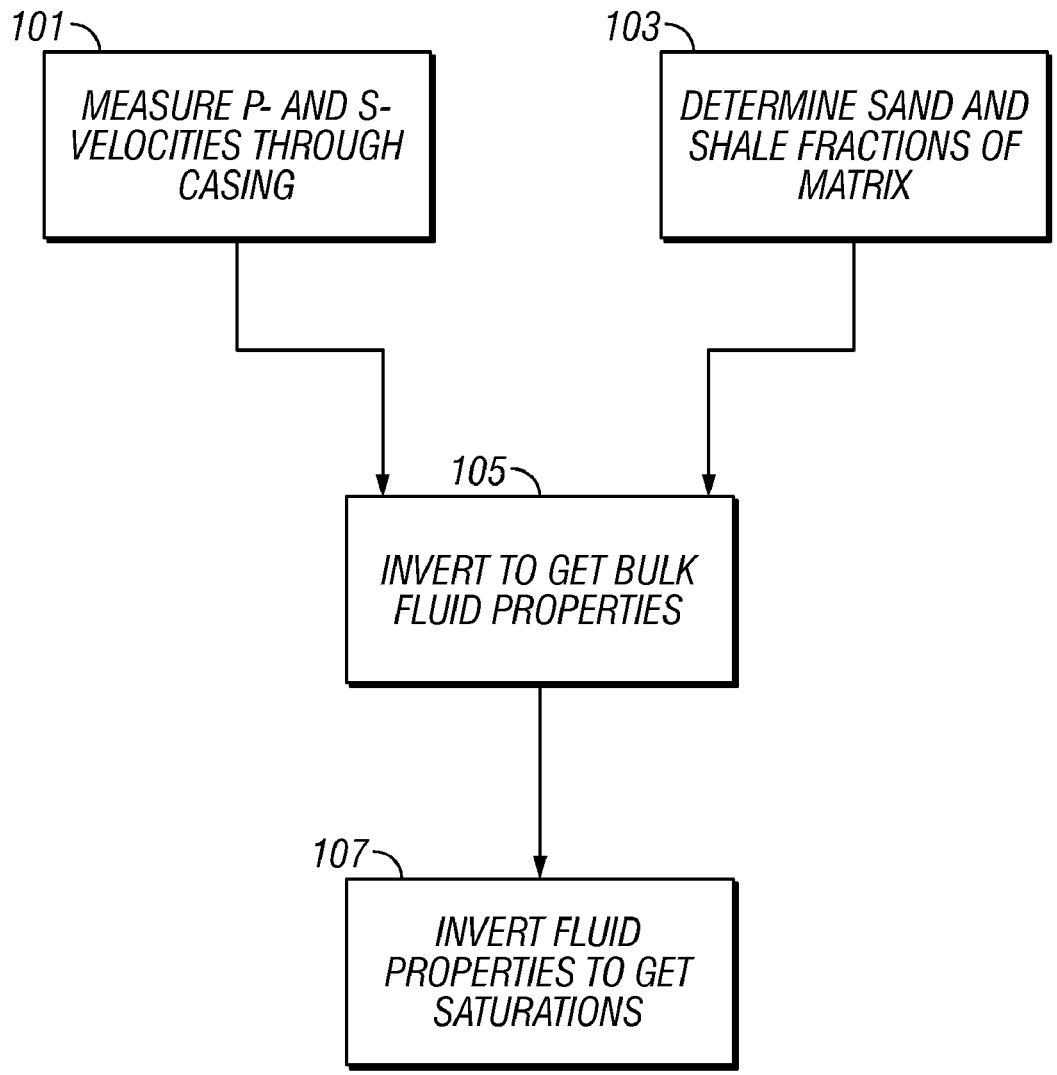
FIG. 3 is a flow chart illustrating some of the steps of the present invention.

Turning now to FIG. 3, a flow chart of part of the method of the present invention is illustrated. At 104, the P- and S- wave velocities of the formation are determined using prior art methods, examples of which have been discussed above. We consider the case where the rock matrix of the earth formation comprises sand and shale. The specific example of a sand/shale formation is not to be construed as a limitation of the method of the invention: the method can be used for other two-component rock matrixes. The model can also be used for multi-component rock matrices by combining the volumes of components with similar properties to reduce the number of components to two.

As discussed below, one of the quantities which is needed in the present invention is the relative fraction of the two components of the rock matrix. For the case of a sand/shale system, the natural gamma ray log gives a good estimate of this relative fraction. For the case where the two components are a sandstone matrix with calcite cement, geochemical analysis using gamma ray analysis (see SPE 7420 of Hertzog et al.) can give the relative amounts of Calcium and Silicon, thus defining the relative fractions of silica and calcite in the matrix.

The present invention also uses the grain moduli of the components of the rock matrix. Typically, this includes the bulk modulus and the shear modulus, though those skilled in the art would recognize that other commonly used moduli that are related to bulk and shear modulus may be used. For the purposes of the present invention, the term bulk and shear modulus are intended to include all combinations of moduli that define the P- and S- velocities of the components of the rock matrix. The invention also uses the porosity of the formation. This can be determined using a neutron porosity log or may also be estimated from the shear velocity of the formation. If the latter is done, then use is made of the fact that the shear modulus of the formation is independent of the fluid properties, the shear waves being sustained almost entirely by the matrix of the earth formation. The density of the formation solid components is computed using a priori values for the densities of the end members and determinations of their relative volume made as described above. The density of the formation is affected by fluid content, and influences the velocities as is well known. Correcting for this involves running the model to determine fluid saturations, adjusting the porosity computed from the shear velocity using this new fluid density, and re-running the analysis until the results converge.

Next, the bulk fluid properties of the earth formation are determined 105 from the measured P- and S- wave velocities and the relative fractions and properties of the two components of the rock matrix. This is discussed further below. Once the bulk fluid properties are known, then the relative fluid fractions of a two component fluid mixture can be estimated 107 as discussed below.

We next discuss the implementation of 105 in the invention. An interactive forward modeling package was developed to investigate the ability of Berryman's (Berryman and Milton, 1991) rock physics model for two-component (composite) properties to predict measured P- and S- wave velocities. Berryman's approach extends Gassmann's (1951) relations using Brown and Korringa's (1975) formalism to allow construction of a composite containing two porous solid constituents. Relationships between porosity and frame moduli for each constituent can be specified independently. The resulting materials can be mixed using any reasonable mixing law, and saturated using Brown and Korringa's (1975) relationship.

First, we compute $V_p$ and $V_s$ from input log data by determining the effective compliance of the solid portion of the porous medium and assuming a variety of pore fluid compliances. A three component mixing model (two solids and the pore space) is used to determine the moduli of the porous frame. By using the frame properties which were determined by forward modeling, we can then determine fluid compliance using bulk density and measured $V_p$ and $V_s$. The results of application of this approach to a variety of log data are discussed below.

Prior to deciding to use Berryman's approach, we considered a number of published models to evaluate their applicability to the problem of pore fluid compliance prediction from acoustic velocities. The approach proposed by Saxena (1996), although similar to Berryman's approach, was not sufficiently general to be widely applicable in practice, as it needlessly restricts the relationship between frame shear and bulk moduli. Effective medium theories, differential effective medium theories, and double embedding techniques (which can also be used to develop multi-component models) were rejected because these rely on mathematical models which restrict their applicability. For example, many models are only applicable for a restricted range of defect concentrations, or are based on very specific component geometries. Berryman's approach to using Brown and Korringa was chosen because (1) it allows the use of any mixing law, (2) it allows the use of any relationship between properties and porosity of the components, and (3) because it relies on measurable quantities in its application.

Berryman's approach is as follows. The formation is assumed to comprise a mixture of two different porous media, welded together such that all porosity is contained in one or the other of the two media. Explicitly, $$\phi = \frac{(\phi_1 V_2 + \phi_2 V_2)}{V}, \quad (1)$$

where $V_1$ and $V_2$ are the volumes of the two components and $\phi_1$ and $\phi_2$ are the corresponding porosities.

Each component material is homogeneous and satisfies Gassmann's relationship, which in Berryman's notation is $$\frac{K_{sat}}{K_o - K_{sat}} = \frac{K^{(i)}}{K_m^{(i)} - K^{(i)}} + \frac{K_f}{\phi(K_o - K_f)}. \quad (2)$$

Each component's properties (principally its frame modulus $K^{(i)}$) can be calculated using its porosity and $K_m^{(i)}$, the modulus of the solid material that makes up its frame. In one embodiment a Hashim-Shtrikman lower bound is used to make this computation, but this is not a requirement, nor is it necessary to use the same method for both components.

Berryman describes methods to compute the effective frame and effective solid bulk moduli of the composite, K* and $K_s^*$, from $$\frac{\sigma^* - \sigma^{(1)}}{\sigma^{(2)} - \sigma^{(1)}} = \frac{K^* - K^{(1)}}{K^{(2)} - K^{(1)}}, \quad (3)$$

with $$\sigma^{(i)} = 1 - K^{(i)}/K_m^{(i)} \quad (4),$$

and from these the composite pore modulus $K_{PHI}^*$. Brown and Korringa's relationship $$\left[\frac{1}{K_{sat}} - \frac{1}{K_s^*}\right]^{-1} = \left[\frac{1}{K^*} - \frac{1}{K_s^*}\right]^{-1} + \left[\sigma\left(\frac{1}{K_f} - \frac{1}{K_\phi^*}\right)\right]^{-1}, \quad (5)$$

allows computation of $K_{sat}$ the bulk modulus of the two-component saturated material from these values and from the porosity PHI ($\phi$) and the pore fluid compliance (1/$K_f$, where $K_f$ is the bulk modulus of the pore fluid).

In practice, $K_{sat}$ is computed from measured compressional and shear velocities $$K_{sat} = \rho(V_p^2 - 4/3 V_s^2) \quad (6),$$

and $\rho$ the bulk density is related to the bulk densities of the components by $$\rho = \rho_1 V_1 + \rho_2 V_2 \quad (7).$$

In each component, its bulk density is related to its porosity and the densities of the fluid and solid grains by $$\rho_i = \rho_g^i (1 - \phi_i) + \rho_f \phi_i \quad (8).$$

In the present embodiment, total porosity $\phi$ may be derived from the shear velocity $V_s$ using any of a number of known relationships. One such relationship is the Hashin-Shtrikman lower bound (Moos and Dvorkin, 1988). $\phi$ may also be obtained independently or from other petrophysical data using well-known methods. The user defines how the pore volume is distributed between the two components. The total pore volume may be 100% in one component, or 100% in the other component, or may be distributed equally between the two, or the porosity may be the same in both, or pore volume may be distributed in any other way provided the total pore volume is contained entirely within the pore spaces of the two components.

Figure 4:
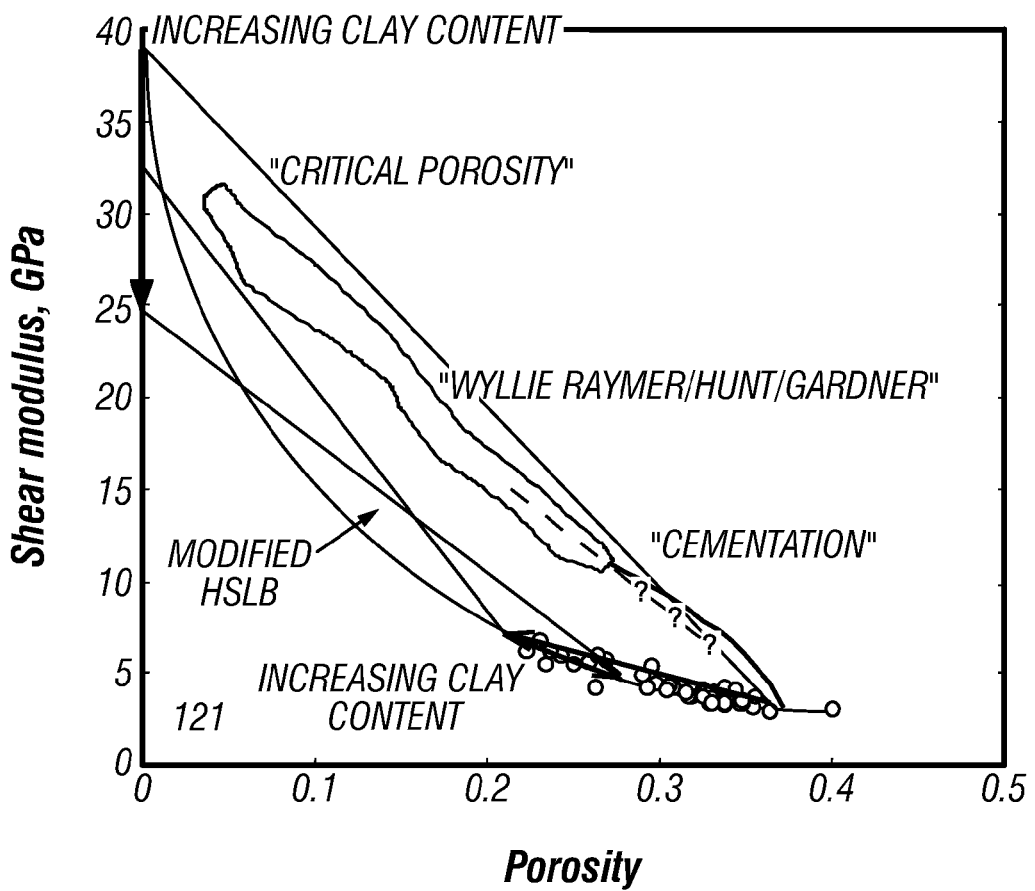
FIG. 4 shows relationships between porosity and modulus for a quartz sand.

In order to apply a two-component model, it is necessary to specify relationships for each component between porosity and modulus. FIG. 4 shows schematically a number of published relationships between porosity and modulus. In this invention, we choose a modified Hashim-Shtrikman lower bound (Dvorkin and Nur, 1996) as appropriate to relate the properties of each component to its porosity. As we will apply our results to unconsolidated materials, this type of model is most appropriate. In practice, any model can be chosen, as mentioned above. The modified Hashim-Shtrikman bound is shown by 121. Relationships appropriate for cemented clastics include cementation models, critical porosity relations, and models such as the Wyllie time-average or Raymer/Hunt/Gardner. Using only one component, it is necessary to vary the endpoint properties to account for changes in volume of (for example) clay. When using the method in other lithologies, empirical and theoretical relationships known to be appropriate for those other lithologies can be used to derive this information.

FIG. 5 shows the input parameter window of an application developed to test this model. We allow either or both components to be porous, and use Hashin-Shtrikman bounds on the mixture, based on selection of the enclosing component. FIG. 5 shows an example in which porosity is the same in both constituents. Relationships between porosity and frame modulus for each component are assumed to follow a modified Hashim-Shtrikman lower bound (Dvorkin and Nur, 1996b; Moos et al., 1997). The mixture law is a volumetric "Bounding Average" similar to that proposed by Marion et al. (1990). Input and output data files are entered using the dialogue in the upper left. The properties of each end member can be specified using entries in the upper right. The lower left box contains push buttons which allow selection of the porosity distribution and the mixing law. A number of plots can be selected to aid in diagnosing the model predictions and to show the results.

It is advantageous to use a bound-type model as this guarantees that the actual properties of the medium will always be limited by the prediction, either from above or below. By applying Berryman's mixing model twice, both upper and lower bounds on the rock properties can be calculated. If these bounds are close together it provides confidence that the results can be applied without knowing how the mixture is achieved in the real world. If they are not, geological insight must be used to select the appropriate component mixture law. The uncertainty in the result can be constrained by running the model using a variety of geometries for the solid phase, including limiting cases where first one bound is computed by surrounding one constituent with the other, and a second bound is computed by reversing their geometrical positions. This along with estimates of the variation in component properties and errors in the measured velocities can be used in a QRA or other statistical approach to derive estimates of the uncertainties in the predicted saturations.

Figure 6:
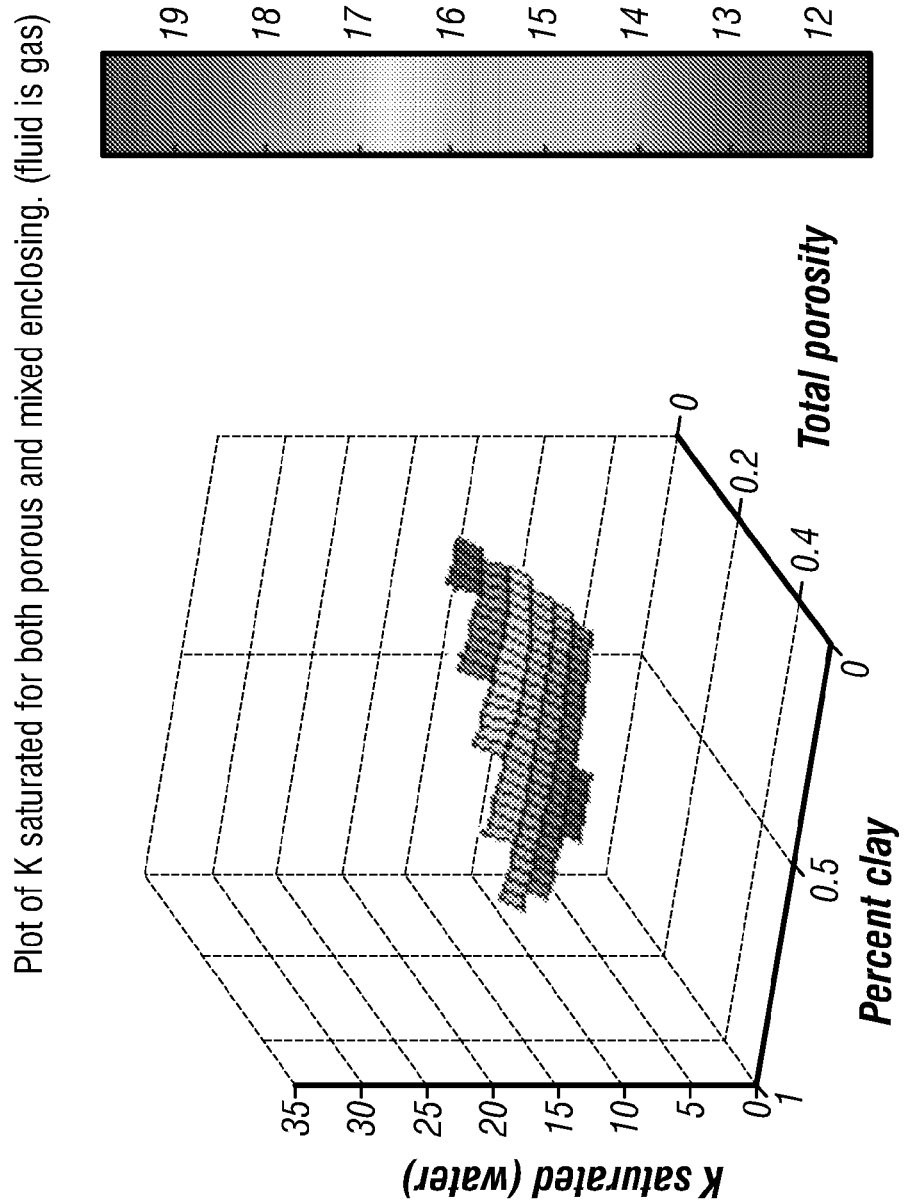
FIG. 6 is a sensitivity plot illustrating the variation in bulk modulus with porosity and clay content.

FIG. 6 shows sensitivity plot illustrating the variation in bulk modulus with porosity and clay content which results from using the parameters shown in FIG. 5. Bulk modulus decreases with increasing porosity. However, the relationship between clay content and bulk modulus is more complicated as the properties of the individual components depend on porosity in different ways.

The model is applied by first fitting a subset of the data. In some ways this is analogous to using a "training set", but in this approach the user can interact with the model to select the parameters. The training set may include compressional and shear-wave velocities, porosity, density, and a log which defines the relative volumes of the two constituents. In shaly sands a gamma-ray log is often available for this purpose. If one can assume an a priori model for the materials, it is possible to carry out a forward model with only the velocities and a constituent volume log. For example, one can use Vs to determine porosity.

The most efficient method when using a training set is to match as closely as possible the shear-wave velocity in intervals which have the highest percentage of each end-member. These provide each single-component porosity/shear modulus relationship. The component porosity/modulus model and parameters, and the mixture model and parameters, are chosen by the user to minimize the misfit between the measured and predicted shear-wave velocity throughout the interval. The same process can be repeated with the bulk modulus.

An alternative approach to determining fluid compliance is through explicit inversion of the Berryman relations. These provide closed-form solutions for fluid compliance as a function of the properties of the components, the porosity and the geometrical locations of the solid components of the rock.

Figure 7:
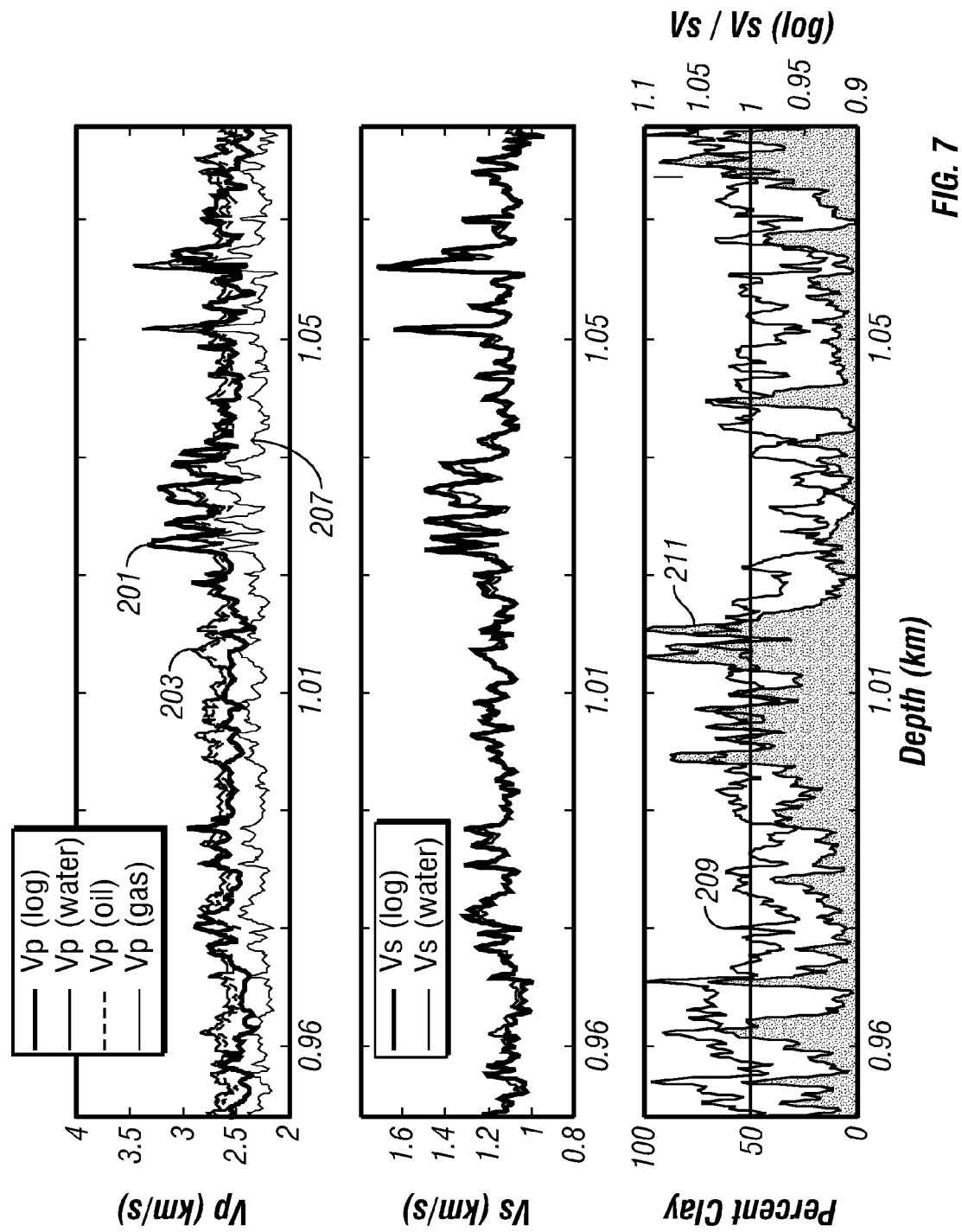
FIG. 7 shows a comparison of calculated $V_p$ and $V_s$ to log values assuming a single solid constituent for the porous frame.
Figure 8:
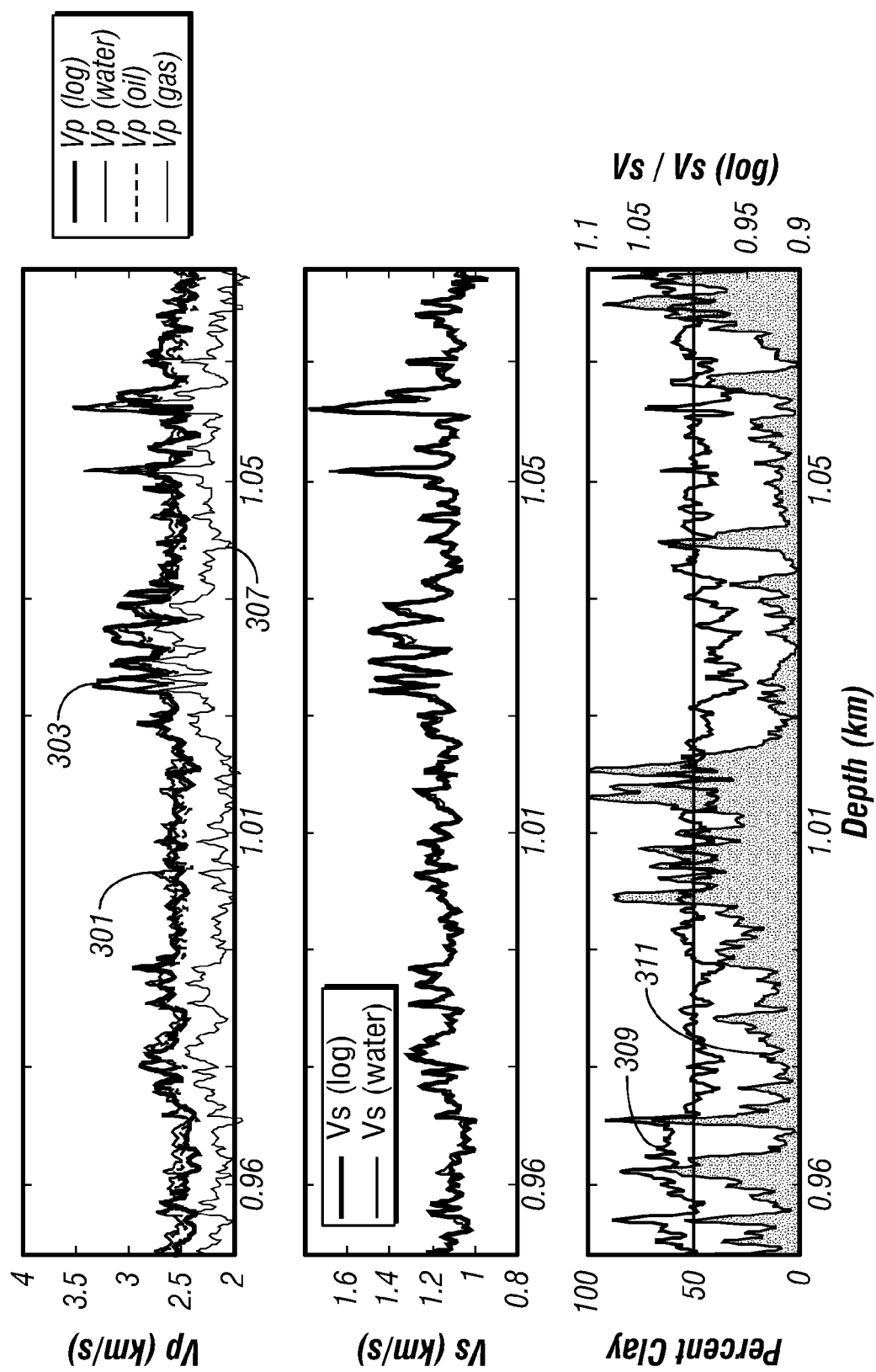
FIG. 8 shows a comparison of calculated $V_p$ and $V_s$ to log values assuming two solid constituents for the porous frame.

FIGS. 7 and 8, respectively, allow comparison of results from the Wilmington field M499 well over the depth range 0.95 to 1.08 km using one (FIG. 7) and two components (FIG. 8). The curve 201 is the measured $V_p$ log and 207 is the model prediction assuming gas saturation. The curves for oil and water saturation are very similar and depicted by 203. The curves in the middle panel are for the measured shear velocity and the predicted shear velocity from the model. The bottom panel of FIG. 7 shows the percent clay 209 and the ratio of predicted to measured shear velocity 211. Although the fit is quite good in both cases, the two-component velocity predictions are more consistent with the measured results. The measured compressional-wave velocities in general lie close to the predicted values for oil and brine, consistent with the fact that there is virtually no free gas in this field. The input parameters for the end members are shown in Table I.

TABLE I

Parameters for Wilmington and Colombian sands and shales

| Parameter | Wilmington One Component | Wilmington Two Components | | Colombia Two Components | |
|---|---|---|---|---|---|
| | | "shale" | "sand" | "shale" | "sand" |
| $K_{crit}$, GPa | 4.20 | 1.50 | 7.00 | 18.00 | 5.00 |
| $G_{crit}$, GPa | 1.10 | 0.90 | 2.20 | 2.9 | 4.60 |
| $K_m$, GPa | 38.00 | 40.00 | 36.00 | 38.00 | 38.00 |
| $G_m$, GPa | 32.00 | 20.00 | 44.00 | 20.00 | 44.00 |
| $Phi_{crit}$ | 0.50 | 0.60 | 0.32 | 0.40 | 0.26 |

In FIG. 8, The curve 301 is the measured $V_p$ log and 307 is the model prediction assuming gas saturation. The measured $V_p$ is 303. The curves in the middle panel are for the measured shear velocity and the predicted shear velocity from the model. The bottom panel of FIG. 8 shows the percent clay 311 and the ratio of predicted to measured shear velocity 309.

Figure 9:
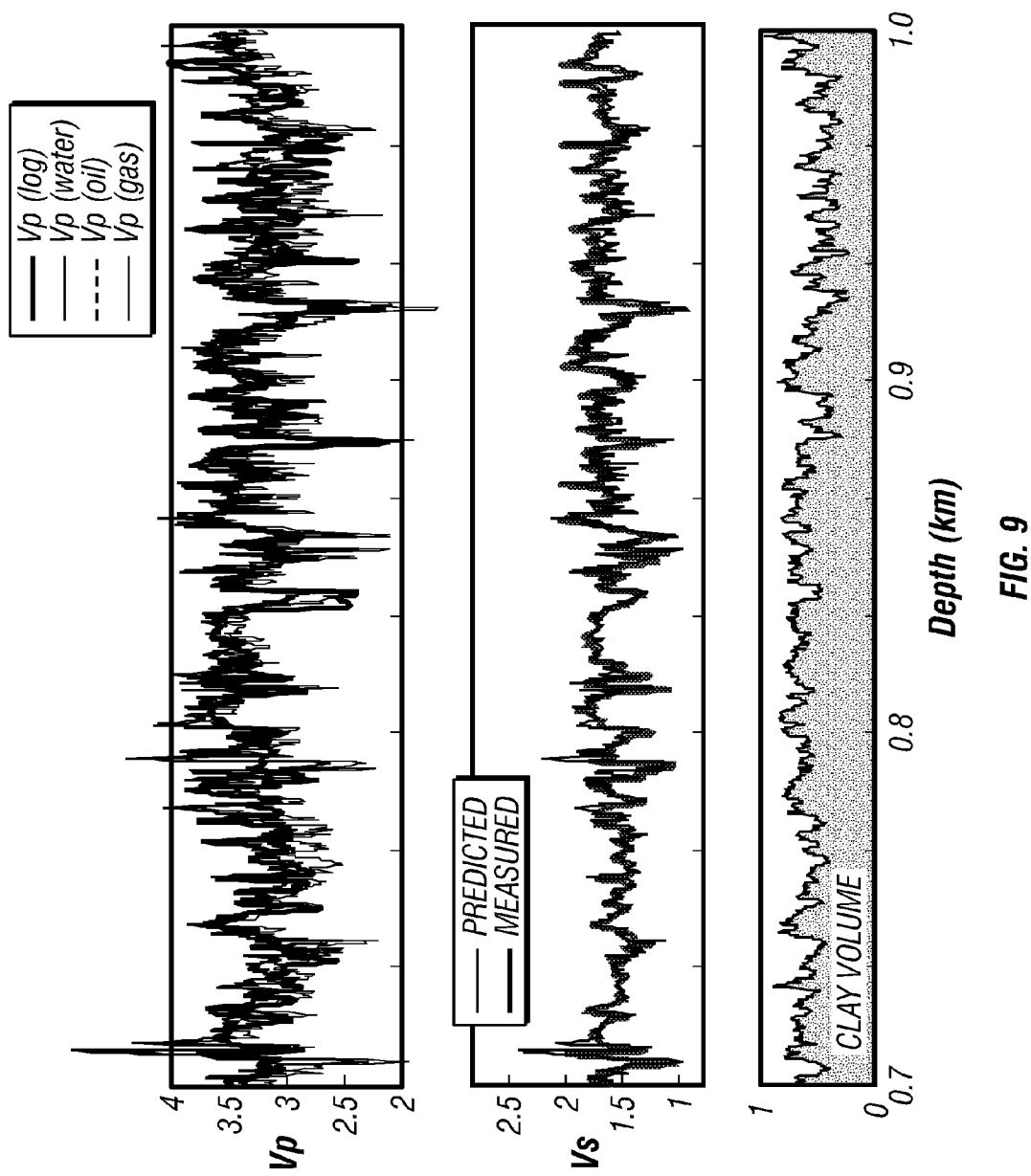
FIG. 9 is a fit to velocity data acquired in a Colombian oil field computed using a two-component model with parameters as shown in Table I.

By comparison, FIG. 9 shows data from a field in Colombia over the depth interval 0.7 to 1.0 km. The parameters which best fit this data using two components are also shown in Table I. In FIG. 7 the slight over-prediction of $V_s$ at shallow depths and under-prediction at greater depths may be an indication of the necessity to vary the parameters to account for the increase in effective confining pressure with depth within the modeled depth interval. This effect can be accounted for along with variations in fluid properties as a function of temperature and gas saturation using prior art.

Figures 10A, 10B:
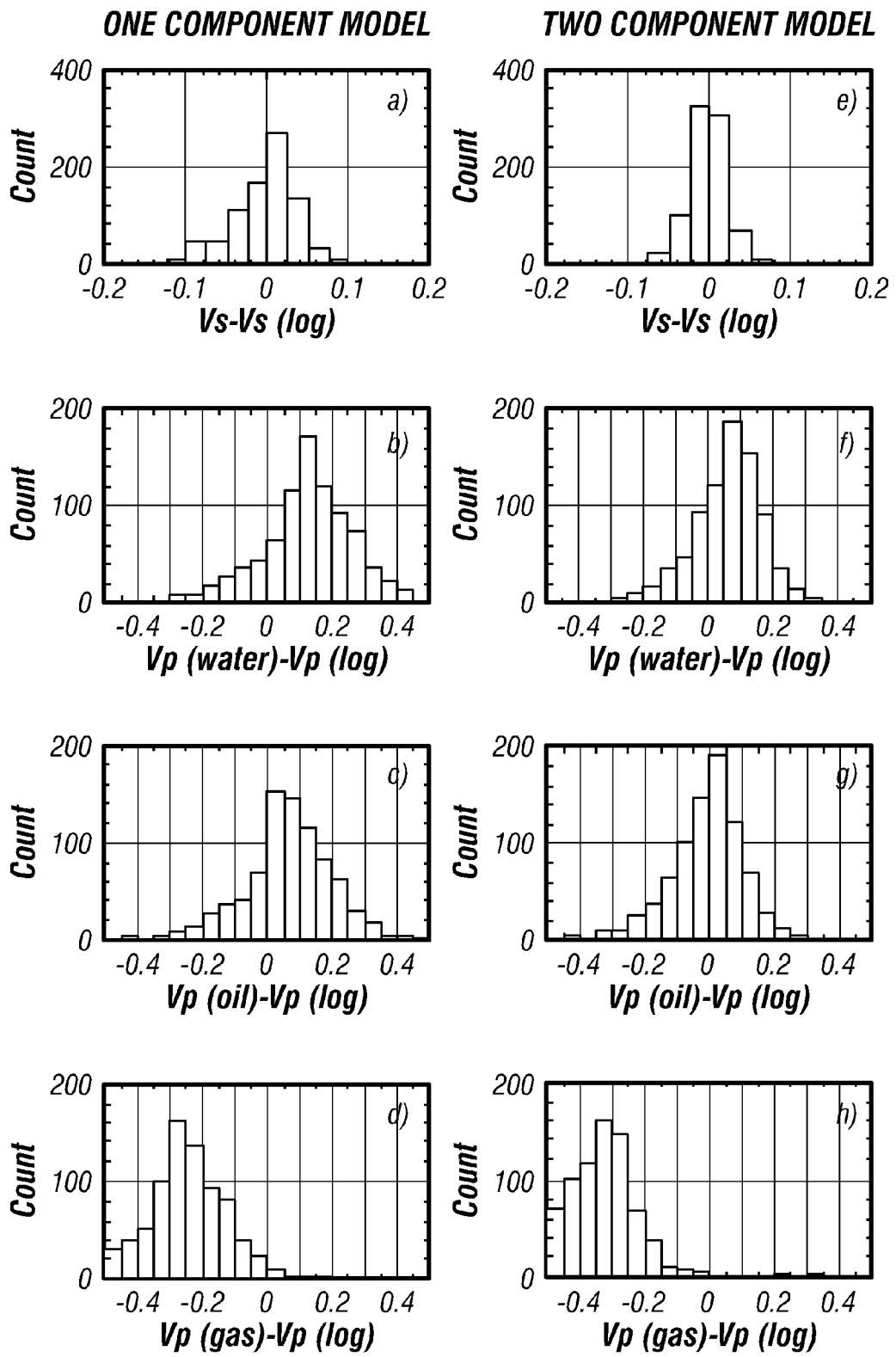
FIGS. 10a and 10b are a histogram of the differences between predicted and measured velocities.

FIGS. 10a and 10b show histograms of differences between measured and predicted velocities using the data from Wilmington modeled in FIGS. 7 and 8. With a single component model, the scatter in the fit to the shear-wave velocity (FIG. 10a) is slightly larger and the mean is not zero. Both models indicate that there is little or no gas in situ (the predicted P-wave velocity assuming gas saturation is much too low). However, the two-component model does a better job placing the measured data between the predictions for water (too high) and oil (too low) than does the single-component model.

Figure 11:
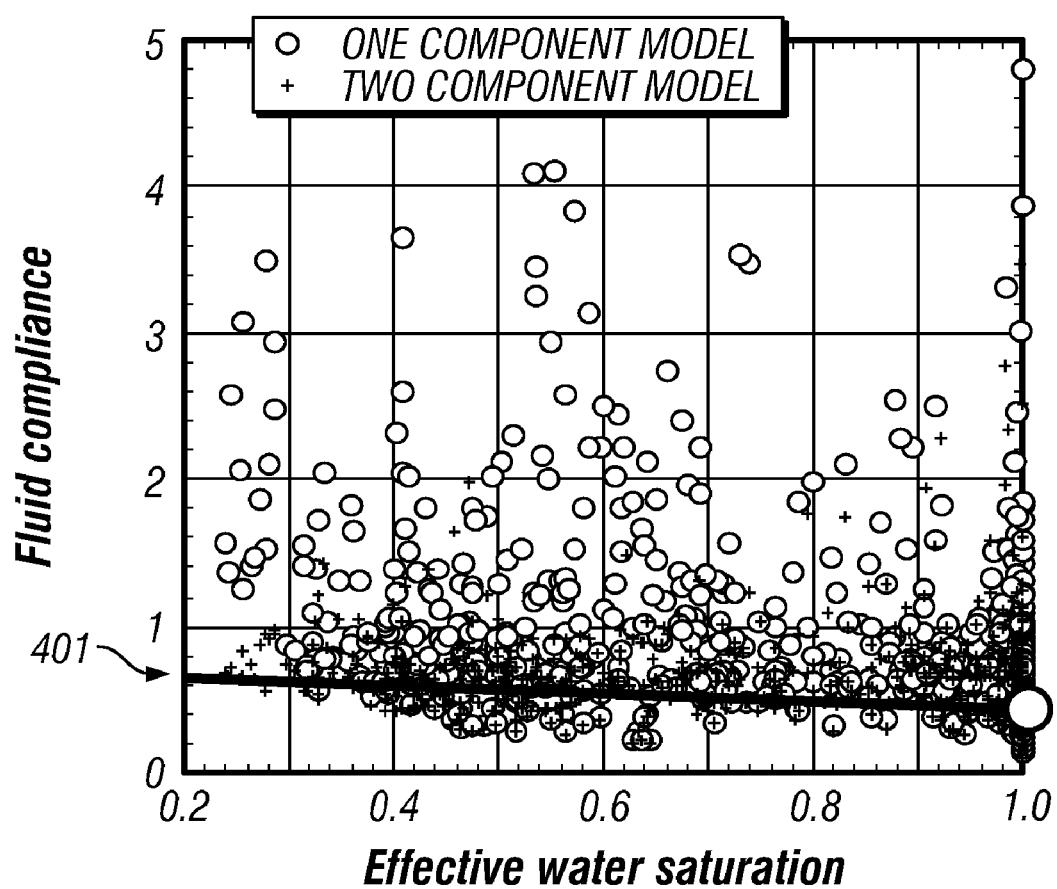
FIG. 11 shows a comparison of one and two component mixing models to predict fluid compliance for data from the Wilmington field.

FIG. 11 shows relationships for the Wilmington field data between saturation derived using Archie's Law and the predicted fluid compliance found by inverting the actual measured velocities. Although the scatter in compliance is larger than the trend with saturation, as expected for the heavy oils found in Wilmington (API 24 or lower in this interval, for which the ratio of brine bulk modulus to oil bulk modulus is approximately 2), the scatter is smaller for the two-component model. The trend 401 does roughly follow an expected volumetric average of the compliances. Similar results were presented by Hornby et al. (1992).

Returning now to FIG. 3, the forward modeling described above can be used to invert for the fluid properties of the pore fluid in the earth formation. This may be done by using conventional gradient techniques to determine the pore fluid compressibility (or bulk modulus). Alternatively, this may be done using a neural net implementation.

For a two component mixture of brine and hydrocarbon, the Reuss and Voight limits of the compressibility are given by $$C_{fl,r} = V_{hc}C_{hc} + (1 - V_{hc})C_{br} \qquad (9)$$

$$\frac{1}{C_{fl,v}} = \frac{V_{hc}}{C_{hc}} + \frac{1 - V_{hc}}{C_{br}},$$

where C refers to compressibility with the subscript fl being used for the bulk fluid, hc being used for hydrocarbon, br for brine, and V refers to saturation. The properties of the end-members (hydrocarbon and brine) being known, it is possible to determine the hydrocarbon saturation from the measured bulk modulus for either the Reuss or the Voight limits. The Reuss limit is preferred for a mixture of fluids.

Figure 12A:
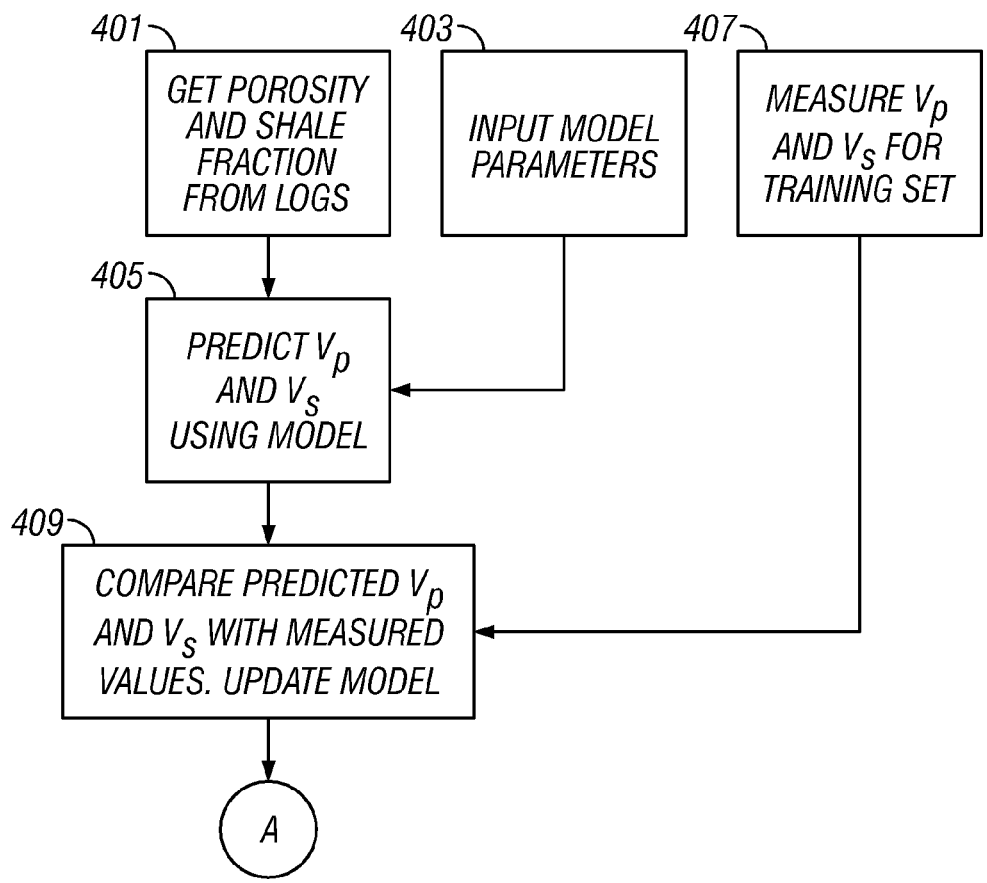
FIGS. 12a and 12b show flow charts summarizing the present invention.
Figure 12B:
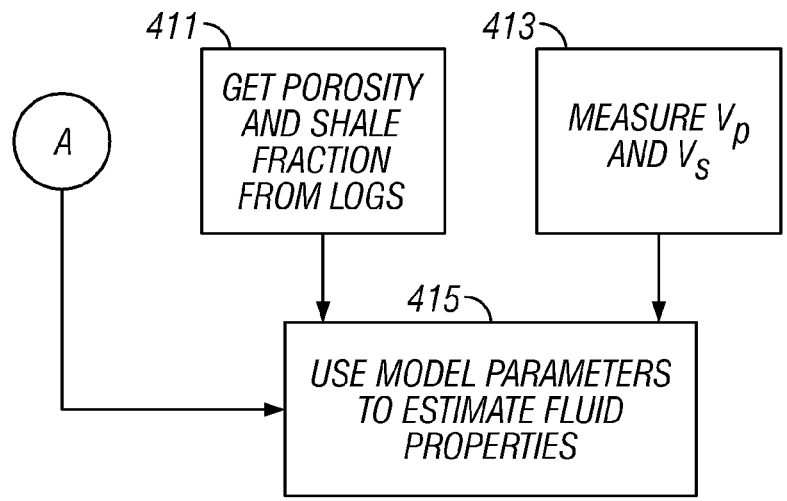

Turning now to FIG. 12a-12b, a flow chart summarizing the method of the present invention is shown. Porosity and shale fraction may obtained from well logs 401. Certain model parameters discussed below are input 403 and values of $V_p$ and $V_s$ for a training set are predicted 405 using the Berryman approach discussed above. The model includes several fixed parameters and several free parameters.

The fixed parameters for the model include the grain moduli for the constituents of the rock matrix (e.g., quartz and clay minerals) 403, the relative fraction of the shale component (obtained from natural gamma ray logs 401) and a total porosity. The total porosity may be obtained from a neutron porosity log 401. Alternatively, the total porosity may be estimated from measurement of shear velocity 401 through casing as described above. The variable model parameters in the Berryman approach discussed above are the distribution of total porosity between the two constituents of the rock matrix and the relation, for each constituent, between the grain modulus and the matrix modulus. These predicted values are compared with actual values of $V_p$ and $V_s$ measured through casing for the training. An example of such a comparison has been shown above in FIGS. 7 and 8. Based on the comparison, the model parameters may be updated 409 to give an acceptable match of the model output and the measured values.

In the examples shown in FIGS. 7 and 8, it is noted that the actual $V_p$ and $V_s$ log values lie between the logs for the "end-members" corresponding to 100% oil, 100% water and 100% gas. This is an indication that the model parameters are consistent with the measurements.

Once an acceptable match has been made, the updated model parameters are used along with $V_p$ and $V_s$ for the formation measured through casing for unknown samples 413 along with measurements of porosity and shale fraction 411 to estimate the fluid properties of the formation 415, the hydrocarbon saturation and other properties of the earth formation that are important for reservoir development. An example of such an inversion has been shown above in FIG. 11 where the ordinate is the fluid compliance and the abscissa is the fluid saturation (estimated independently from other measurements using Archie's law). A two-component fluid mixture has a smaller scatter than a single component inversion and, as noted above, follows an expected volumetric average for brine and oil.

There are a number of areas in which the present invention may be used. One use is in estimating fluid saturation through casing in marginal wells that are close to being abandoned. Such wells typically are cased and do not have a full suite of logs available. In such wells, it is possible to make measurements through casing of the necessary formation properties so as to be able to estimate the fluid properties of the formation. This may then be used to guide further development work on the well in terms of perforating selected intervals for further production. Another use of the method is in reservoir monitoring. Based on the estimated fluid properties, appropriate action may be taken such as opening or closing of sleeves or other flow control devices, turning on or off of pumps or other fluid injection devices in the borehole or another borehole. A specific problem commonly encountered in oilfields is decreased recovery of oil when gas comes out of solution due to a drop in reservoir pressure. By using this method, the presence of gas can be detected and appropriate remedial action (such as increasing the formation pressure by injection of fluid into an injection well) taken. The opposite situation may occur in development of coalbed methane: recovery of methane depends upon the presence of free gas in the reservoir. When a drop in gas saturation is detected, then formation pressure should be decreased to get the methane out of solution.

The processing of the measurements made in wireline applications may be done by the surface processor 33, by a downhole processor, or at a remote location. The data acquisition may be controlled at least in part by the downhole electronics. Implicit in the control and processing of the data is the use of a computer program on a suitable machine readable medium that enables the processors to perform the control and processing. The machine readable medium may include ROMs, EPROMs, EEPROMs, Flash Memories and Optical disks. The term processor is intended to include devices such as a field programmable gate array (FPGA).

While the foregoing disclosure is directed to the specific embodiments of the invention, various modifications will be apparent to those skilled in the art. It is intended that all such variations within the scope and spirit of the appended claims be embraced by the foregoing disclosure.

What is claimed is:

1. A method of evaluating an earth formation having at least two components in a matrix of the formation, the method comprising:
    (a) measuring a compressional velocity and a shear velocity of the formation through a casing in a borehole in the earth formation;
    (b) measuring a porosity of the earth formation through the casing;
    (c) measuring a fraction of one of the at least two components of the earth formation through the casing; and
    (d) using a two-component mixing model, the measured compressional velocity, the measured shear velocity, the measured porosity and the measured fraction of the one component of the earth formation to estimate a property of a fluid in the formation;
    wherein each component of the two-component model satisfies a relation of the form:

$$\frac{K_{sat}}{K_o - K_{sat}} = \frac{K}{K_m - K} + \frac{K_f}{\phi(K_o - K_f)}$$

where $\phi$ is a porosity, K is a frame modulus, $K_m$ is a grain modulus, and $K_f$ is a fluid modulus.

2. The method of claim 1 wherein the one of the at least two components comprises a shale and measuring the fraction further comprises making a measurement of natural gamma radiation in the borehole.

3. The method of claim 1 wherein estimating the property of the fluid further comprises estimating at least one of (i) a compliance of a fluid, and (ii) a saturation of a fluid in the earth formation.

4. The method of claim 1 wherein using the model further comprises a distribution of a total porosity between the at least two components.

5. A method of evaluating an earth formation having at least two components in a matrix of the formation, the method comprising:
- (a) measuring a compressional velocity and a shear velocity of the formation through a casing in a borehole in the earth formation;
- (b) measuring a porosity of the earth formation through the casing;
- (c) measuring a fraction of one of the at least two components of the earth formation through the casing; and
- (d) using a two-component mixing model, the measured compressional velocity, the measured shear velocity, the measured porosity and the measured fraction of the one component of the earth formation to estimate a property of a fluid in the formation;

further comprising defining the model by:
- (i) obtaining measurements of a compressional velocity and a shear velocity for a training set; and
- (ii) selecting a model parameter that improves a match between a predicted velocity from the model and at least one of (A) a measured compressional velocity for the training set, and (B) a measured shear velocity for the training set.

6. The method of claim 5 wherein selecting the model parameter further comprises selecting a sample from the training set that has a value close to 100% of one of the at least two components.

7. The method of claim 1 further comprising identifying an interval in the borehole having a high saturation of a fluid in the formation.

8. The method of claim 1 wherein the property of the fluid further comprises a hydrocarbon saturation, the method further comprising perforating an interval of the borehole based on the estimate hydrocarbon saturation.

9. The method of claim 1 wherein the property of the fluid comprises a gas saturation, the method further comprising altering a fluid pressure at another borehole.

10. A system for evaluating an earth formation having at least two components in a matrix of the formation, the system comprising:
- (a) a logging tool conveyed in a cased borehole in the earth formation, the logging tool configured to make a measurement of a shear velocity of the formation, a compressional velocity of the formation, a porosity of the earth formation, and a fraction of at least one of the two components of the matrix; and
- (b) a processor configured to use a two-component mixing model, the measured compressional velocity, the measured shear velocity, the measured porosity and the measured fraction of the at least one component of the earth formation to estimate a property of a fluid in the formation;

wherein the processor is further configured to define each component of the two-component model using a relation of the form:

$$\frac{K_{sat}}{K_o - K_{sat}} = \frac{K}{K_m - K} + \frac{K_f}{\phi(K_o - K_f)}$$

where $\phi$ is a porosity, K is a frame modulus, $K_m$ is a grain modulus, and $K_f$ is a fluid modulus.

11. The system of claim 10 wherein the one of the at least two components comprises a shale and wherein the logging tool is configured to measure the fraction by further being configured to make a measurement of natural gamma radiation in the borehole.

12. The system of claim 10 wherein the processor is further configured to estimate at least one of (i) a compliance of a fluid, and (ii) a saturation of a fluid in the earth formation.

13. The system of claim 10 wherein the processor is further configured to use the model by defining a distribution of porosity between the at least two components.

14. A system for evaluating an earth formation having at least two components in a matrix of the formation, the system comprising:
- (a) a logging tool conveyed in a cased borehole in the earth formation, the logging tool configured to make a measurement of a shear velocity of the formation, a compressional velocity of the formation, a porosity of the earth formation, and a fraction of at least one of the two components of the matrix; and
- (b) a processor configured to use a two-component mixing model, the measured compressional velocity, the measured shear velocity, the measured porosity and the measured fraction of the at least one component of the earth formation to estimate a property of a fluid in the formation;

wherein the processor is further configured to define the model by:
- (i) obtaining measurements of a compressional velocity and a shear velocity for a training set; and
- (ii) selecting a model parameter that improves a match between a predicted velocity from the model and at least one of (A) a measured compressional velocity for the training ser, and (B) a measured shear velocity for the training set.

15. The system of claim 14 wherein the processor is further configured to select the model parameter by using a sample from the training set that has a value close to 100% of one of the at least two components.

* * * * *